INVENTOR.
Bernard Long.
BY
Harness, Dickey & Pierce.
ATTORNEYS.

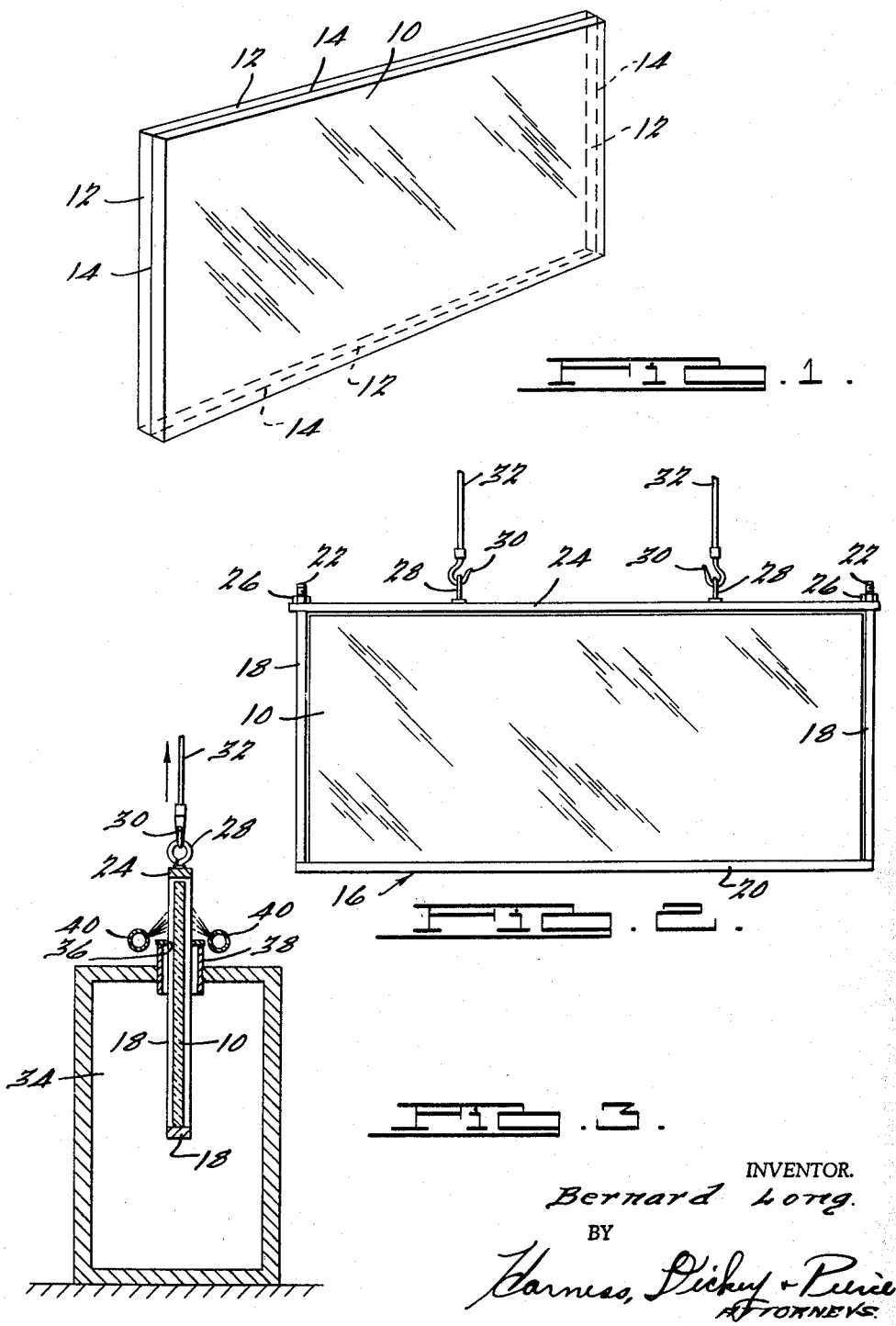

Nov. 8, 1960  B. LONG  2,959,507
METHOD FOR CLEAVING GLASS SHEETS AND NEW ARTICLES
OF MANUFACTURE THEREBY OBTAINED
Filed May 31, 1957  3 Sheets-Sheet 3
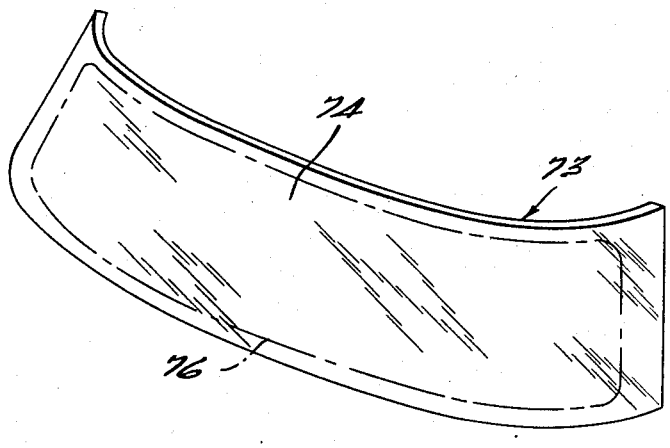
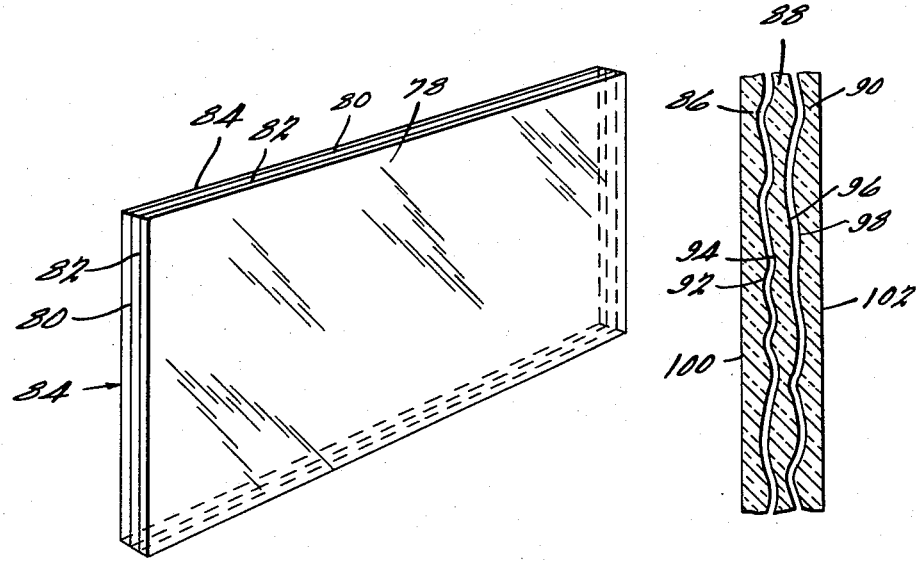
INVENTOR.
Bernard Long.
BY
Harness, Dickey & Pierce
ATTORNEYS United States Patent Office 2,959,507
Patented Nov. 8, 1960

2,959,507
METHOD FOR CLEAVING GLASS SHEETS AND NEW ARTICLES OF MANUFACTURE THEREBY OBTAINED

Bernard Long, Paris, France, assignor to Glaces de Boussois, S.A., Paris, France, a corporation of France Filed May 31, 1957, Ser. No. 662,614

Claims priority, application France Oct. 12, 1956

11 Claims. (Cl. 154—2.73)

This invention relates to a method for cleaving glass sheets generally along a plane parallel to the faces thereof, and more particularly to a method for cleaving a glass sheet into separate sheets which can be reunited to form a laminated glass sheet of high quality.

Laminated glass for windows of automotive vehicles, and the like, has heretofore been manufactured by joining two sheets of glass together with a thin plastic interlayer disposed between the sheets to bond them together upon the application of heat. In order to obtain the most desirable optical characteristics, the faces of each of the glass sheets which make up the laminated sheet are ground and polished. This also provides relatively flat mating surfaces for the glass sheets which facilitates the transmission of light without distortion. Laminated glass manufactured in this manner has proved to be relatively expensive and a major portion of the expense is attributable to the need for grinding and polishing the faces of the glass sheets.

This invention eliminates the need for grinding and polishing the mating faces of laminated glass sheets by providing a method for cleaving a glass sheet into separate sheets which can be accurately mated together to obtain a laminated glass sheet having optical characteristics approaching those of the original glass sheet before it was cleaved.

The method comprises the steps of scoring a line around the edge of a glass sheet substantially equidistant from each face thereof, heating the glass to a temperature slightly below its strain point temperature, and symmetrically cooling both faces of the glass sheet simultaneously. The internal temperature gradients produced by the cooling action create opposed forces normal to each face of the glass sheet which cleave the glass into two separate sheets, the scratch around the edge of the glass sheet serving as a starting point for the cleavage forefront.

The resulting separate sheets can be reunited to form a laminated glass sheet since each cleaved inner face is a perfect complement of the other. Conventional transparent plastic materials having an index of refraction close to that of the glass sheets may be used for bonding the sheets together, and the optical characteristics of the resulting laminated glass are superior to those of laminated glass having ground and highly polished mating faces.

A further feature of the invention resides in the fact that a single glass sheet can also be cleaved into three separate sheets which can be reconstituted to obtain a laminated sheet having optical characteristics approaching those of the original sheet from which they were cleaved. The method for accomplishing a double cleavage is the same as that previously described for the single cleavage with the exception that two parallel equally spaced lines are scratched around the edge of the glass sheet rather than one. When the sheet is heated and cooled as before, a cleavage forefront originates at each of the scratches on the edge first cooled and the glass sheet is cleaved into three sheets rather than two.

The middle sheet will, of course, have two cleaved faces each of which perfectly complement, and register with, the corresponding cleaved inner face of one of the outer sheets so that all three sheets may be mated with interlayers of bonding material therebetween to reconstitute the original sheet.

It is one object of the invention to provide a method for cleaving a glass sheet generally along a plane parallel to the faces thereof.

It is another object of the invention to provide a method for cleaving a glass sheet generally along a plane parallel to the faces thereof to form separate glass sheets having cleaved inner faces which perfectly complement each other so that they can be mated together to form laminated glass.

It is a further object of the invention to provide a method for making laminated glass.

It is a still further object of the invention to provide a laminated glass sheet having cleaved mating faces with optical characteristics superior to those of a laminated glass sheet having highly ground and polished mating faces.

Other objects and features of novelty of the invention will be specifically pointed out or will otherwise become apparent when referring, for a better understanding of the invention, to the following description taken in conjunction with the accompanying drawings, wherein:

Figure 1 is a perspective view of a glass sheet having a relatively deep score on all four edges thereof to serve as a starting point for a cleavage forefront in accordance with the invention;

Fig. 2 is a plan view of the glass sheet illustrated in Fig. 1 supported by a metal frame and suspension rods;

Fig. 6 is a plan view of a large glass sheet divided into three smaller glass sheets which can be cut out after the large glass sheet has been cleaved;

Fig. 7 is a perspective view of a glass sheet bent to form a curved automobile windshield in accordance with another embodiment of the invention;

Fig. 8 is a perspective view of a glass sheet having parallel spaced-apart scored lines on the edges thereof which serve as starting points for two cleavage forefronts to enable the sheet to be cleaved into three separate sheets in accordance with still another embodiment of the invention; and Fig. 9 is a broken sectional view of the double cleaved glass sheet illustrated in Fig. 9.

Figure 4:
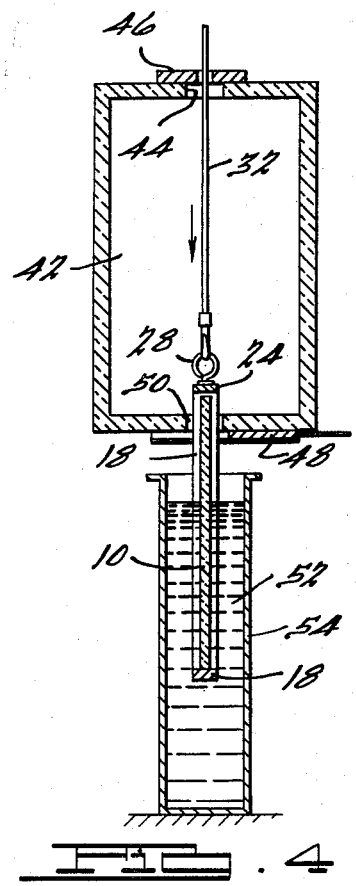
Fig. 4 is a sectional view of a glass sheet passing from a heating enclosure into a cool liquid bath to simultaneously cool both faces of the heated glass sheet in accordance with another embodiment of the invention.

Referring to Fig. 1, to prepare a glass sheet 10 for cleaving in accordance with the invention, it is preferable, although not necessary, to grind and roughly polish all four edges 12 of the sheet 10. A line 14 is then scored on the edges 12 substantially equidistant from each of the faces of the glass sheet 10 by a diamond tool or a thermal shock.

Scoring the edge of a glass sheet by a thermal shock is well known in the glass industry and consists briefly of locally overheating the edges 12 along the line 14 by a heated wire, and cooling the edge with running water or a water soaked rag. This produces a deep score or scratch along the line 14 since it is the portion of the edge which was heated most.

After the line 14 has been scored on the edges 12, the glass sheet is supported in a metal frame 16 as illustrated in Fig. 2. The metal frame 16 is comprised of two vertical bars 18 welded to a lower cross bar 20 and having threaded portions 22 on the upper ends thereof. An upper cross bar 24 is fastened to the vertical bars 18 by a pair of nuts 26 cooperating with the threaded portions 22. Two rings 28 are mounted on the upper cross bar 24 and are adapted to be engaged by hooks 30 of suspension rods 32 to support the glass sheet 10 and frame 16 from above.

The frame 16 closely fits against the edges 12 of the glass sheet 10 without any appreciable gaps therebetween. If necessary, a thin layer of deformable material, such as asbestos, can be inserted between the glass and the metal frame to facilitate the desired complete contact therebetween. The purpose of this will be described hereinafter in greater detail.

Figure 3:
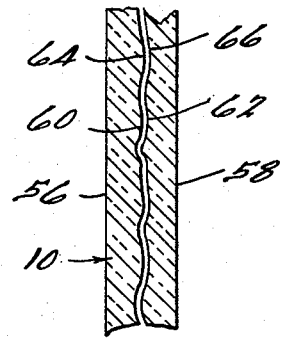
Fig. 3 is a vertical sectional view of a glass sheet partially drawn from a heating enclosure and passing between two pipes directing streams of cool air on both faces of the heated glass sheet.

The glass sheet 10 is then lowered within a heating enclosure 34, as illustrated in Fig. 3, by means of the suspension rods 32 and heated to a temperature lower than the strain point temperature of the glass and this temperature is well known to those skilled in the glass industry as that temperature below which glass may be practically considered as no longer capable of a plastic deformation. It is also well known that this temperature corresponds to a viscosity of about $10^{15}$ poises.

The glass sheets actually used in commerce, including both plate and drawn glass sheets, belong to the family of soda lime glasses the principal constituents of which are: Silica ($SiO_2$), soda ($Na_2O$) and lime ($CaO$), the secondary constituents being: Magnesia ($MgO$) and alumina ($Al_2O_3$). There are distinct variations in the compositions of the different glass sheets manufactured by different producers and these variations exist in the primary constituents as well as in the secondary. However, the variations have partly compensating effects, so that they in fact have only a relatively moderate influence on the value of the strain point temperature for the various compositions of glass. Therefore, it can be estimated that the strain point temperature of the different glass sheets actually used in commerce is approximately between 450° and 500° C. and this estimate is sufficient for determining the temperature below which the glass sheets are to be heated prior to cleaving.

The selection of the actual temperature that the glass sheet 10 is to be heated below the 450° to 500° C. range depends on a number of parameters, such as, the thickness of the sheets, their surface condition, the cooling procedure to be applied, and the desired cleaving speed, and can readily be determined by those skilled in the glass art. By way of example, a temperature between 300° and 400° C. is generally suitable for cleaving glass sheets having a thickness of six millimeters and cooled by air sweeping. When the glass sheet 10 having a thickness of five to six millimeters is cooled by immersing it in a liquid bath at room temperature, as will hereinafter be described, it is not necessary to heat the sheet to a temperature exceeding 150° C.

After the glass sheet 10 has been completely heated to the appropriate temperature, it is drawn through a rectangular aperture 36 in a collar 38 on the top of the heating enclosure 34 by the suspension rods 32. The edge 12 having the greatest dimension is preferably drawn from the heating enclosure 34 first. As it is moved upwardly out of the heating enclosure 34, the glass sheet 10 passes between two horizontally disposed blowing pipes 40 which direct streams of air against each of the faces of the glass sheet 10 to symmetrically cool the faces thereof. The collar 38 is preferably made of polished metal, such as aluminum, to prevent the cooling of the sheet by radiating heat over the heating enclosure walls during the ascending motion of the sheet.

Due to the symmetrical cooling of the faces of the glass sheet 10 by the blowing pipes 40, a temperature gradient is produced between the outer layers of the sheet and the middle layer thereof which tends to bend each outer layer from its initial position and consequently engenders two systems comprising opposed forces respectively normal to the faces of the glass sheet. These forces cause a crack or fissure which originates at the scratch 14 on the upper edge and the glass sheet begins to split into two separate sheets.

As the glass sheet 10 continues to move upwardly between the blowing pipes 40, the splitting action which may more appropriately be called a cleavage forefront sweeps the surface of the glass sheet until the sheet is completely split or cleaved into two separate sheets.

Fig. 4 illustrates another manner for cooling the glass sheet 10 in accordance with the present invention. In this embodiment, the glass sheet is lowered into a heating enclosure 42 through an aperture 44 in the top of the enclosure which is then covered by a cover plate 46. After the glass sheet 10 is heated to the appropriate temperature, a sliding cover plate 48 is moved out of the way and the glass sheet is slowly lowered through an aperture 50 in the bottom of the heating enclosure 42 into a liquid bath 52 contained in a tank 54 disposed beneath the heating enclosure. The liquid bath serves the same function as the blowing pipes 40 of Fig. 3, and symmetrically cools the faces of the glass sheet 10 to cleave it into two separate sheets.

Figure 5:
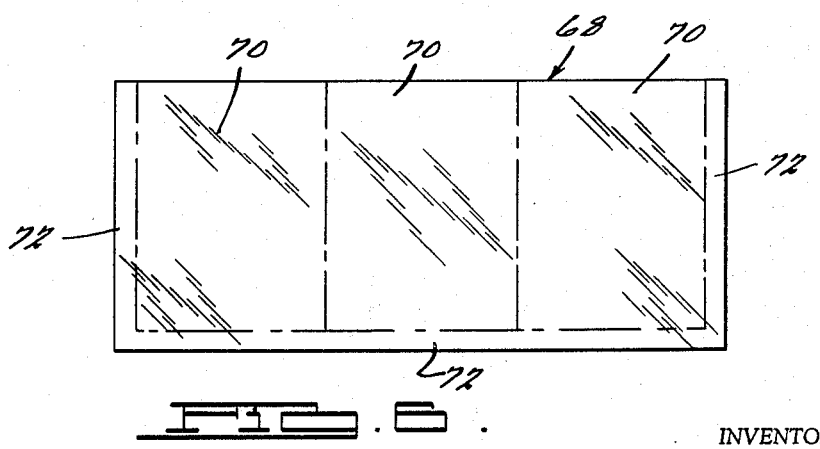
Fig. 5 is a broken sectional view of a cleaved glass sheet illustrating features of the invention.

Referring to Fig. 5, it will be observed that the cleavage is wave-like and is substantially equidistant between outer faces 56 and 58 of the glass sheet 10. This produces cleaved inner faces 60 and 62 on each of the halves of the glass sheet which perfectly complement each other to enable the faces 60 and 62 to register one with the other to reconstitute the original glass sheet 10. The cleaved faces 60 and 62 perfectly complement each other because for every elevated portion 64 on the inner face 60 there is a corresponding depressed portion 66 on the inner face 62 and vice versa.

When the cleaved glass sheet 10 is viewed in a direction perpendicular to one of the cleaved faces 60 and 62, a definite curved cleavage pattern can be observed. When so viewed, it is apparent that the cleavage forefront originates at the center portion of the top edge of the glass sheet 10 and that the first few curved cleavage lines are concave with each successive curved line extending laterally outwardly until the ends thereof approach the vertical sides of the glass sheet. At or near this point, the curved cleavage lines reverse themselves and become slightly convex due to the cleavage forefront originating at the scratches 14 on the vertical edges of the sheet. The curved cleavage lines retain this convex attitude as the cleavage forefront progresses downwardly to the bottom edge of the glass sheet.

When the extremities or ends of the convex curved cleavage lines approach the bottom edge of the glass sheet, a second cleavage forefront originates at the scratch 14 on the lower edge of the glass sheet and progresses upwardly to meet the first cleavage forefront to complete the cleavage of the glass sheet 10. The meeting of the two cleavage forefronts results in a series of circular and sharply curved convex lines at the center of the bottom portion of the glass sheet 10. The side portions of the sheet may also be similarly affected due to the meeting of the original or first cleavage forefront with the forefronts originating at the vertical sides of the sheet. Such conjunction or interference results in surface irregularities in the cleaved faces which, as a practical matter, generally are allowable in laminated glass sheets. However, should the irregularities become too prominent, the narrow bands affected thereby can be cut off and discarded.

After the glass sheet 10 has been cleaved, a transparent liquid or thin layer of plastic material having an index of refraction preferably as close to that of the glass sheet as possible is interposed between the cleaved faces 60 and 62 of the cleaved sheet, and the faces 60 and 62 bonded together to form a laminated glass sheet. When the cleaved halves of the glass sheet 10 are so reconstituted, the distortion of light crossing the interfaces between the glass and bonding material is negligible and undiscernable to the eye. In fact, the vision through a laminated glass sheet made of a pair of cleaved glass sheets approaches the vision through the original uncleaved glass sheet.

By way of example only, a plastic material which has proved to be completely satisfactory for bonding the separate cleaved halves of the glass sheet 10 is polyvinyl butyral having a refractive index as near as possible as that of the glass sheet. However, the conventional methods and materials heretofore used for bonding laminated glass can be employed with equal success to the present invention and it is specifically intended that the invention not be limited by the particular material used to bond the cleaved faces 60 and 62 of the glass sheet 10.

Also by way of example only, a glass sheet 10 having a width of six millimeters was cleaved in accordance with the method of the present invention by heating the glass sheet in an electrically heated enclosure to a temperature of approximately 400° C. and subsequently passing the sheet between a pair of blowing pipes at a relatively low speed of approximately three centimeters per second. Of course, it is apparent that many variations may be made by those skilled in the art to obtain the most suitable arrangement and it has been found that other cleaving speeds ranging from one centimeter per second to approximately thirty centimeters per second can be successfully employed and there is no reason why even faster cleaving speeds would not be possible provided that other parameters are suitably varied.

The frame 16 which surrounds and supports the glass sheet 10 is generally made of metal and serves as an important heat bearing mass to prevent a too rapid or brisk cooling of the edges 12 which, if permitted, might initiate scratches. The frame 16 maintains the edges of the glass sheet warmer than the adjacent glass which places the edges in a light state of compression to delay the departure of the cleavage forefront. In this regard, the vertical sides of the frame 16 may advantageously be made of nickel tubing containing an electrical resistance drowned in an insulating powder, similar to a Calrod tube construction.

As previously mentioned, it is preferable to originate the cleavage forefront at the longest edge of the glass sheet. This permits the imperfections of the cleaved faces, due to the perturbations of the cleavage forefront along the side and bottom portions of the glass sheet, to be reduced.

Further, to cleave a square sheet, it would be advantageous to cleave a larger sheet 68 having a width greater than the square sheet as illustrated in Fig. 6, and if necessary, increased by a safety margin. The glass sheet 68 is cleaved as before, with the top edge cooled first, and then cut along the dotted lines to obtain cleaved sheets 70 having the desired dimensions.

Due to the aforesaid safety margin, outer portions 72 along the vertical sides and bottom of the sheet 68 may be discarded to eliminate the narrow bands which are likely to have the most distortion. It is apparent that by cleaving the larger glass sheet 68, rather than the individual glass sheets 70, the percentage of the wasted portions 72 relative to the useable area of the glass sheet is reduced.

Fig. 7 illustrates a cleaved glass sheet 73 bent to form a curved windshield 74. The bending operation is performed in a conventional manner and a dotted line 76 indicates the exact outline of the windshield 74 which is to be cut from the cleaved glass sheet 73 in accordance with the conventional practice. It is apparent that the conventional practice for cutting a curved windshield from a larger curved glass sheet will also serve to remove the defects or distortions having a tendency to arise adjacent the outer portions of a cleaved glass sheet.

The cleaving process of the present invention is also applicable for cleaving previously bent glass sheets to form curved automobile windshields, and the like. As before the initial scratch is made along the center lines of the edges of the curved glass sheet with a diamond and the glass sheet cleaved in the same manner as a flat sheet is cleaved. When this procedure is followed, the original curved glass sheet is cleaved into two separate curved sheets which can be reconstituted to form a laminated curved windshield. It may, however, prove to be more advantageous to bend a flat sheet previously cleaved to produce a laminated glass curved windshield. Cleaved glass sheets lends themselves particularly well to bending due to the perfect mating relation of the cleaved faces of the cleaved glass sheet.

Referring to Figs. 8 and 9, a glass sheet 78 is illustrated having two lines 80 and 82 scratched completely around the edges 84 thereof by a diamond tool equally spaced from one another and the faces of the glass sheet 78. When the glass sheet 78 is cleaved in accordance with the previously described method of the present invention, two cleavage forefronts originate due to the two scratches 80 and 82 and produce two cleaved surfaces 96 and 98 as illustrated in Fig. 9. The glass sheet 78 consequently is cleaved into three separate sheets 86, 88 and 90 having pairs of cleaved faces 92 and 94, and 96 and 98 which correspond perfectly with one another.

When the transparent plastic or liquid material is inserted between the sheets 86, 88 and 90, the sheets may be pressed against each other and bonded together to reconstitute the original glass sheet 78. The glass sheets 86, 88 and 90 are pressed together by exerting a force perpendicular to outer faces 100 and 102 of the glass sheets 86 and 90 when they are in the relative position shown in Fig. 9, the idea being to press the sheets together without causing any sliding movement between the cleaved faces. As before, the reconstituted glass sheet has optical characteristics approaching those of the original glass sheet before cleavage when the index of refraction of the transparent bonding material is as close as possible to that of the glass.

Thus, the double cleaving operation provides three separate cleaved sheets substantially for the same cost as the single cleaving operation, the only extra cost being the additional sheet of transparent bonding material, and a much stronger laminated glass may be produced. This is in marked contrast with the usual practice for manufacturing such a laminated glass sheet wherein the four mating faces of three separate sheets are ground and polished before bonding them together.

What is claimed is:

1. A process for producing relatively thin glass sheets from a relatively thick glass sheet having substantially parallel opposed surfaces and edges, said edges having very substantially less area than said parallel opposed surfaces, which process comprises scoring said edges, generally parallel to said opposed surfaces of said thick glass sheet, thereafter subjecting the thus scored thick glass sheet to heating, and then to cooling, to cleave said thick glass sheet into said thin glass sheets, said scoring being sufficient, in combination with heating and cooling, to initate fracture of said thick glass sheets in a plane generally parallel to said parallel opposed surfaces.

2. A process for producing relatively thin glass sheets from a relatively thick glass sheet having substantially parallel opposed surfaces and edges, said edges having very substantially less area than said parallel opposed surfaces and lying in planes generally perpendicular thereto, which process comprises scoring said edges along a line generally parallel to and spaced from said parallel opposed surfaces, thereafter heating the thus scored glass sheet to a predetermined temperature, and then cooling said heated thick glass sheet relatively rapidly and progressively across the sheet in a direction transverse to a line of scoring to cleave said thick glass sheet into said thin glass sheets, said scoring being sufficient, in combination with said heating and cooling, to initiate fracture of said thick glass sheet in a direction generally parallel to said opposed surfaces.

3. A process for producing relatively thin glass sheets from a relatively thick glass sheet having substantially parallel opposed surfaces and edges, said edges having very substantially less area than said parallel opposed surfaces and lying in planes generally perpendicular thereto, which process comprises scoring said edges along a line generally parallel to and spaced from said parallel opposed surfaces, thereafter heating the thus scored glass sheet to a substantially uniform temperature less than the strain point of said glass, and then progressively cooling each of said opposed surfaces simultaneously to cleave said thick glass sheet into two separate sheets of the same area as, but approximately one-half the thickness of, said original thick glass sheet, said scoring being sufficient, in combination with said heating and cooling treatment, to initiate fracture of said thick glass sheet.

4. A process for producing relatively thin glass sheets from a relatively thick glass sheet having substantially parallel opposed surfaces and edges, said edges having very substantially less area than said parallel opposed surfaces and lying in planes generally perpendicular thereto, which process comprises scoring said edges along a pair of lines spaced from each other and spaced from and generally parallel to said opposed surfaces, thereafter heating the thus scored glass sheet to a substantially uniform temperature less than the strain point of the glass, and then progressively cooling each of said opposed surfaces simultaneously to cleave said thick glass sheet into three separate glass sheets, each having a surface area substantially equal to that of said opposed surfaces on said thick glass sheet and each having a thickness approximately one-third of the original thickness of said thick glass sheet, the scoring of each of said lines being sufficient in combination with said heating and cooling treatment, to initiate fracture of said thick glass along a plane generally parallel to and spaced from said opposed surfaces.

5. The method of producing laminated glass from a relatively thick glass sheet having substantially parallel opposed surfaces and edges, said edges having very substantially less area than said parallel opposed surfaces, which process comprises scoring said edges along a line generally parallel to said parallel opposed surfaces of said thick glass sheet and thereafter subjecting the thus scored thick glass sheet to heating, and then to cooling, to cleave said thick glass sheet into separate thin glass sheets, said scoring being sufficient, in combination with said heating and cooling, to initiate fracture of said thick glass sheet in a plane generally parallel to said parallel opposed surfaces, and subsequently interposing a plastic material between said separate thin sheets and bonding the same together to form a unitary laminated glass sheet.

6. The method of producing laminated glass elements from a glass sheet having a pair of substantially parallel opposed surfaces and edges, said edges having very substantially less area than said parallel opposed surfaces and lying in planes generally perpendicular to said parallel opposed surfaces, which method comprises scoring said edges along a line generally parallel to and spaced from said parallel opposed surfaces, heating the thus scored glass sheet to a temperature less than the strain point of the glass and then simultaneously cooling each of said opposed surfaces progressively across the glass sheet in a direction transverse to a line of scoring to cleave said glass sheet along a plane substantially parallel to said opposed surfaces into two separate thin glass sheets, subsequently interposing a plastic material between the confronting cleaved surfaces of said thin sheets and utilizing said plastic to bond said sheets together in the same position relative to each other as they occupied prior to said cleavage, whereby a unitary laminated glass element is formed having a thickness generally equal to the thickness of the original glass sheet plus the thickness of the layer of plastic bonding material.

7. The method of producing a laminated glass element from a glass sheet having a pair of substantially parallel opposed surfaces and edges, said edges having very substantially less area than said parallel opposed surfaces and lying in planes generally perpendicular to said parallel opposed surfaces, which method comprises first scoring said edges along a line generally parallel to but spaced from said opposed surfaces, heating said glass sheet to a temperature less than the strain point of the glass, subsequently simultaneously cooling each of the opposed surfaces of said sheet to cleave the same into two separate thin sheets of glass along a plane generally parallel to said opposed surfaces, interposing a layer of transparent plastic material, having an index of refraction approximately that of the glass, between the cleaved faces of said separate thin sheets, and utilizing said plastic to bond said sheets together in the same relative position with respect to each other as they occupied prior to cleavage to form a unitary transparent laminated glass element.

8. The method of producing a curved laminated glass element from a curved glass sheet having two substantially parallel curved surfaces and edges, said edges having every substantially less area than said parallel opposed curved surfaces, which method comprises scoring said edges along a line spaced from said opposed curved surfaces, heating said scored curved glass sheet to a predetermined temperature, then cooling the sheet progressively across the surfaces thereof in a direction transverse to a line of scoring to cleave the same into curved thin glass sheets having surfaces of substantially the same area as said curved glass sheets, and then interposing a plastic material between the cleaved surfaces of said separate thin curved sheets, and utilizing said plastic to bond said thin sheets together in the same position relative to each other as they occupied prior to cleavage to form a unitary curved laminated glass element.

9. A laminated glass element comprising a plurality of sheets of glass bonded together by means of a layer of plastic material, each of said sheets having a pair of opposed surfaces and edges of very substantially less area than said surfaces, said plurality of bonded sheets presenting two outer surfaces polished to the desired surface finish, with juxtaposed surfaces of adjacent sheets having slightly undulating irregular surface configurations of the type which results from thermal cleavage, said juxtaposed surface configurations being completely and totally complemental to each other.

10. A transparent laminated glass sheet comprising a pair of sheets of glass bonded together in face to face relationship by means of a layer of transparent plastic material, each of said sheets having an outer surface, an inner surface and edge means, said edges being of substantially less area than said surfaces, the outer surfaces of each of said sheets being polished to the desired surface finish, the inner surface of each of said sheets having a slightly undulating, irregular and unpolished surface configuration of the general type which results from thermal cleavage, the said configuration of the inner surface of one of said sheets being completely and totally complemental to the configuration of the inner surface of the other of said sheets.

11. A transparent curved laminated glass element comprising a pair of curved sheets of glass bonded together by means of a layer of transparent plastic material, said curved sheets having outer and inner surfaces and edges of substantially less area than said surface, the outer surface of each of said sheets being polished to the desired surface finish, the inner surface of each of said sheets, having a slightly undulating, irregular and unpolished surface configuration of the general type which results from thermal cleavage, the configuration of the inner surface of each of said sheets being completely and totally complemental to the configuration of the other of said sheets.

References Cited in the file of this patent

UNITED STATES PATENTS

| | | |
|---|---|---|
| 1,443,731 | Comstock | Jan. 30, 1923 |
| 1,692,619 | Brown | Nov. 20, 1928 |
| 1,748,080 | Reece | Feb. 25, 1930 |
| 1,980,970 | Monro | Nov. 13, 1934 |
| 1,981,703 | Monro | Nov. 20, 1934 |
| 2,125,922 | Hopfield | Aug. 9, 1938 |
| 2,351,033 | Gabor | June 13, 1944 |
| 2,378,091 | McCormick | June 12, 1945 |
| 2,470,461 | Black | May 17, 1949 |
| 2,584,851 | Dunipace | Feb. 5, 1952 |

FOREIGN PATENTS

| | | |
|---|---|---|
| 332,485 | Great Britain | July 24, 1930 |
| 860,264 | Germany | Dec. 18, 1952 |
| 1,098,579 | France | Mar. 9, 1955 |

UNITED STATES PATENT OFFICE
CERTIFICATE OF CORRECTION

Patent No. 2,959,507                      November 8, 1960

Bernard Long

It is hereby certified that error appears in the printed specification of the above numbered patent requiring correction and that the said Letters Patent should read as corrected below.

Column 6, line 19, for "lends" read -- lend --; column 8, line 41, for "sheets" read -- sheet --; line 62, for "edge means" read -- edges --.

Signed and sealed this 25th day of April 1961.

(SEAL)
Attest:

ERNEST W. SWIDER
Attesting Officer

DAVID L. LADD
Commissioner of Patents